US011272031B2

(12) United States Patent
Sethi et al.

(10) Patent No.: US 11,272,031 B2
(45) Date of Patent: Mar. 8, 2022

(54) DEVICE CONFIGURATION USING ARTIFICIAL INTELLIGENCE-BASED PROFILING

(71) Applicant: Dell Products L.P., Round Rock, TX (US)

(72) Inventors: Parminder Singh Sethi, Ludhiana (IN); Suren Kumar, Katpadi (IN); Veena R, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 127 days.

(21) Appl. No.: 16/867,847

(22) Filed: May 6, 2020

(65) Prior Publication Data

US 2021/0352159 A1    Nov. 11, 2021

(51) Int. Cl.
| | | |
|---|---|---|
| *H04L 29/08* | (2006.01) | |
| *H04L 67/303* | (2022.01) | |
| *G06K 9/62* | (2022.01) | |
| *H04L 67/00* | (2022.01) | |
| *G06N 20/00* | (2019.01) | |

(52) U.S. Cl.
CPC ......... *H04L 67/303* (2013.01); *G06K 9/6215* (2013.01); *G06K 9/6267* (2013.01); *G06N 20/00* (2019.01); *H04L 67/34* (2013.01)

(58) Field of Classification Search
CPC ..... H04L 67/303; H04L 67/34; G06K 9/6215; G06K 9/6267; G06N 20/00
See application file for complete search history.

(56) References Cited

U.S. PATENT DOCUMENTS

| | | | |
|---|---|---|---|
| 2015/0195768 A1* | 7/2015 | Abraham | H04W 48/16 370/254 |
| 2020/0379673 A1* | 12/2020 | Le Gallo-Bourdeau | G06N 20/00 |
| 2021/0099457 A1* | 4/2021 | Guo | H04L 63/105 |

FOREIGN PATENT DOCUMENTS

WO    WO-2019149207 A1 *  8/2019  ............ G06F 8/427

OTHER PUBLICATIONS

A. Yanpi et al., "A Large-Margin Approach for Multi-Label Classification Based on Correlation Between Labels," 2019 5th Conference on Knowledge Based Engineering and Innovation (KBEI), Tehran, Iran, 2019, pp. 713-716.

(Continued)

*Primary Examiner* — Michael A Keller
(74) *Attorney, Agent, or Firm* — Ryan, Mason & Lewis, LLP

(57) ABSTRACT

A processing platform comprises at least one processor coupled to at least one memory, and is configured to obtain a set of profiles for configuring a set of devices in an information processing system wherein, for a given device, a given profile comprises one or more configuration attribute values corresponding to one or more components of the given device. The processing platform divides each of at least a portion of the profiles of the set of profiles into two or more sub-profiles to form a set of sub-profiles wherein, for a given divided profile of a given device, two or more sub-profiles respectively correspond to two or more components of the given device. The processing platform stores the set of sub-profiles for use in configuring another device in the information processing system.

20 Claims, 11 Drawing Sheets

(56) References Cited

OTHER PUBLICATIONS

X. Wang et al., "STS-NLSP: A Network-Based Label Space Partition Method for Predicting the Specificity of Membrane Transporter Substrates Using a Hybrid Feature of Structural and Semantic Similarity," Frontiers in Bioengineering and Biotechnology, Nov. 6, 2019, vol. 7, Article 306, 13 pages.

* cited by examiner

FIG. 1

| BIOS CONFIGURATION | BI ANALYTICS | HPC | SDS ScaleIO | SDS VSAN | VIRTUALIZATION |
|---|---|---|---|---|---|
| LOGICAL PROCESSORS | 64CORES | 32CORES | 32CORES | 32CORES | 32CORES |
| VIRTUALIZATION TECHNOLOGY | ENABLED | DISABLED | ENABLED | ENABLED | ENABLED |
| IOMMU SUPPORT | DISABLED | DISABLED | ENABLED | ENABLED | ENABLED |
| HW PREFETCHER | DISABLED | ENABLED | ENABLED | ENABLED | ENABLED |
| SW PREFETCHER | ENABLED | ENABLED | ENABLED | ENABLED | ENABLED |
| MADT CORE ENUMERATION | ENABLED | DISABLED | DISABLED | DISABLED | DISABLED |
| NUMA NODES PER SOCKET | ROUND ROBIN | LINEAR | ROUND ROBIN | ROUND ROBIN | LINEAR |
| CCX AS NUMA DOMAIN | 4 | 2 | 1 | 1 | 2 |
| Min SEV-ES ASID | AUTO | AUTO | ENABLED | ENABLED | AUTO |
| X2APIC | | | | ENABLED | |
| NUMBER OF CCDS PER PROCESSORS | ENABLED | ENABLED | ENABLED | ENABLED | DISABLED |
| NUMBER OF CORE PER CCD | ALL | ALL | ALL | ALL | |
| IDRAC DIRECT USB PORT | ALL | ALL | ALL | ALL | ALL |
| SRIOV ENABLE | ENABLED | | | ENABLED | ENABLED |
| MEMORY MAPPED I/O LIMIT | | | | 1 TB | 8 TB |
| SYSTEM PROFILE | PERFORMANCE | | | | |
| SYSTEM SECURITY | | | TPM ENABLED | | |
| WORKLOAD PROFILE | NA | HPC | SDSProfile | SDSProfile | NA |
| IDRAC CONFIGURATION | | | | | |
| IDRAC CONFIGURATION INTERFACES | USB DIRECT CLI | iDRAC GUI | ANSIBLE | SPECTRE | USB DIRECT GUI |
| POWER CAP | ENABLED | | ENABLED | | |
| DIRECTORY AUTHENTICATION | | | STANDARD SCHEMA | STANDARD SCHEMA | |
| REMOTE SysLog SERVER | ENABLED | ENABLED | ENABLED | ENABLED | ENABLED |
| SNMP | SNMP v2 | SNMP v2 | SNMP v2 | SNMP v2 | SNMP v3 |
| LICENSE | | | | | |
| CUSTOM CERT | X | | | | |
| DNS REGISTER | ENABLED | ENABLED | ENABLED | ENABLED | ENABLED |

*FIG. 2*

```
"Component": {
    {
        "@FQDD": "EventFilters.Storage",
        "Attribute": [
            .....
        ]
    } , {
        "@FQDD": "NIC.Intergrated",
        "Attribute": [
            .....
        ]
    } , {
        "@FQDD": "EventFilters.Updates",
        "Attribute": [
            .....
        ]
    } , {
        "@FQDD": "EventFilters.Configuration",
        "Attribute": [
            .....
        ]
    }
}
```

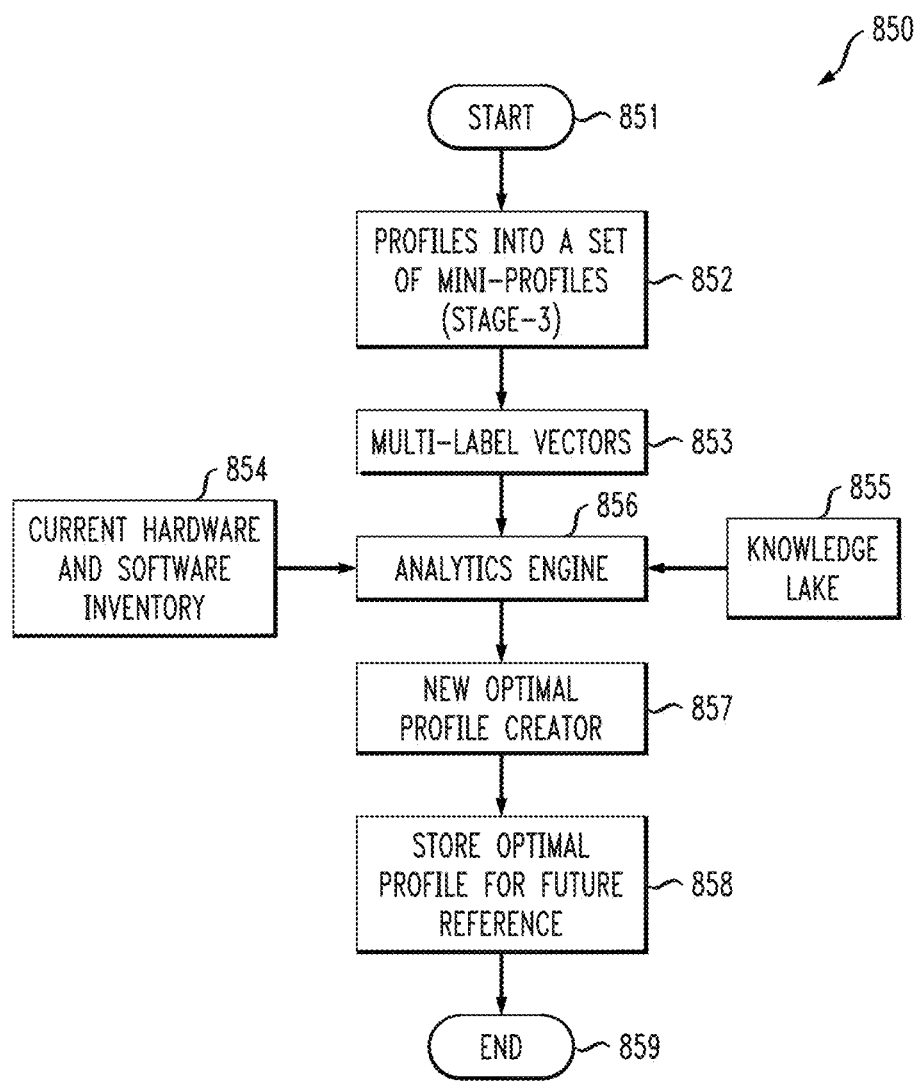

DEVICE CONFIGURATION USING ARTIFICIAL INTELLIGENCE-BASED PROFILING

FIELD

The field relates generally to information processing systems, and more particularly to device configuration in information processing systems.

BACKGROUND

Information processing systems such as data centers typically include a large number of servers (host devices) which are configured to execute workloads associated with one or more software application programs (applications) and access data on a large number of storage arrays (storage devices) over one or more communications networks with a large number of network switches and routers (network devices). Each device (host, storage and network) itself has many hardware, software and/or firmware components, by way of example only, a central processing unit (CPU), a hard disk drive, a cooling fan, a power supply, a basic input/output system (BIOS), etc. Each of these components has various configurable attributes which impact device and application performance.

Data center (enterprise) administrators typically have to understand each attribute and select the appropriate value for the appropriate application/workload. Profiling techniques are also typically used to generate a configuration profile (profile) for each device wherein the profile contains values of all of the attributes of the device components. In a data center environment that employs profiling, administrators configure large sets of devices by importing the profiles from the device itself and/or from a profile repository. However, managing this vast number of profiles is a significant challenge for data center administrators.

SUMMARY

Illustrative embodiments provide techniques for configuring devices with profiling using one or more artificial intelligence/machine learning algorithms.

For example, in one illustrative embodiment, a processing platform comprises at least one processor coupled to at least one memory, and is configured to obtain a set of profiles for configuring a set of devices in an information processing system wherein, for a given device, a given profile comprises one or more configuration attribute values corresponding to one or more components of the given device. The processing platform divides each of at least a portion of the profiles of the set of profiles into two or more sub-profiles to form a set of sub-profiles wherein, for a given divided profile of a given device, two or more sub-profiles respectively correspond to two or more components of the given device. The processing platform stores the set of sub-profiles for use in configuring another device in the information processing system.

Further illustrative embodiments are provided in the form of non-transitory computer-readable storage medium having embodied therein executable program code that when executed by at least one processor causes the at least one processor to perform the above-mentioned operations. Still further illustrative embodiments comprise methodologies performed by a processing platform comprising at least one processor coupled to at least one memory.

These and other features and advantages of embodiments described herein will become more apparent from the accompanying drawings and the following detailed description.

BRIEF DESCRIPTION OF DRAWINGS

FIG. 1 depicts an example attribute list and values as per application/workload with which one or more illustrative embodiments can be applied.

FIG. 2 depicts an example of a profile with which one or more illustrative embodiments can be applied.

FIG. 8B depicts a workflow for the artificial intelligence-based analysis stage of FIG. 8A according to an illustrative embodiment.

DETAILED DESCRIPTION

Illustrative embodiments will be described herein with reference to exemplary information processing systems and associated host devices, storage devices, network devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

As mentioned above, each device (host, storage and network) in an information processing system has many hardware, software and/or firmware components, and each of these components has various configurable attributes which impact device and application performance. FIG. 1 shows a table 100 with an attribute list and sample values of each attribute as per application/workload. More particularly, as shown, the columns represent exemplary devices and rows represent exemplary configurable component attributes of the devices. As is evident from table 100, which is just a partial list of attributes and values, device configuration in a data center can involve a volumous amount of attributes and values.

In a data center environment that employs profiling, administrators configure large sets of devices by importing the profiles from the device itself and/or a profile repository. By way of example, a profile may be pushed from the device or pulled from a profile repository.

FIG. 2 depicts an example of at least a portion of a device configuration profile 200. As shown, profile 200 contains configuration settings for components comprising network interface card (NIC) integration and different event filters associated with a given device in a data center. These components have different attributes required for taking action in accordance with the component.

As mentioned above, at present, user (e.g., data center administrator) intervention is required to import a profile. For example, the user has to identify the appropriate profile based on application usage (e.g., present/future) along with a list of network addresses (e.g., Internet Protocol or IP addresses) of servers that need to be configured.

Figure 3:
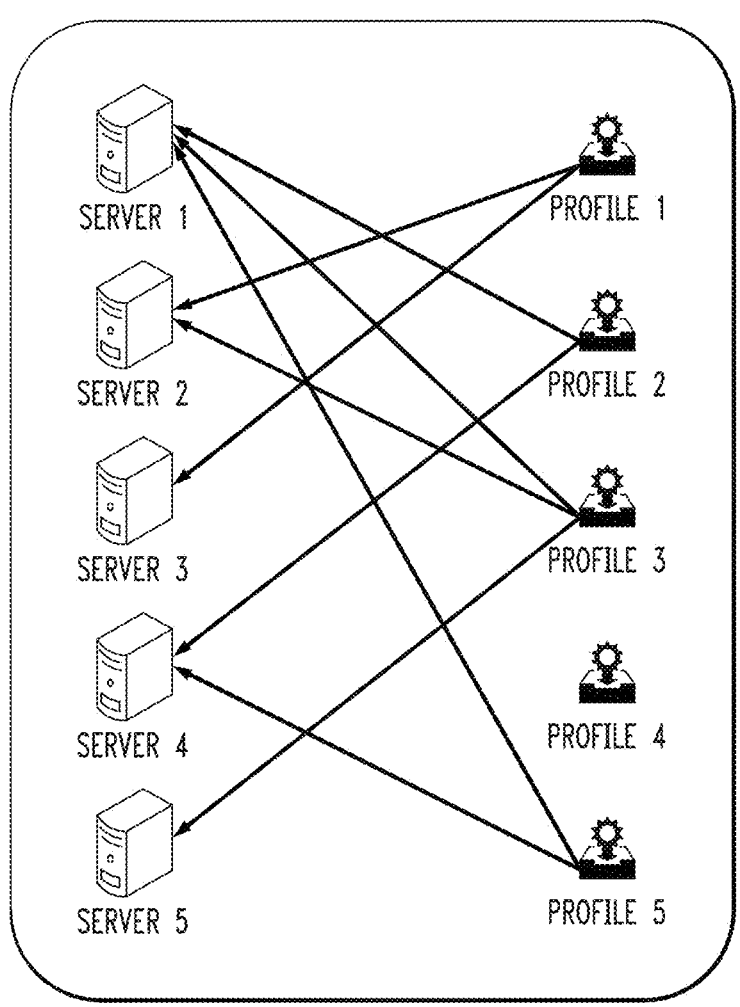
FIG. 3 depicts an example of a profile configuration of servers with which one or more illustrative embodiments can be applied.

In a typical data center, the administrator has to manage a significant number of servers and profiles. Further, to add to the challenge and as depicted in FIG. 3 as example 300 of a profile configuration of servers, a single server (e.g., Server 1) may require multiple profiles when the server is re-used for different applications/workloads over a period of time. It is even possible that a server may not have any profile configured. Such profiling must be done when adding a new device(s) to the data center and when changing the configuration of an existing device. For example, assume a sixth server is added to the data center in FIG. 3 (e.g., Server 6, not expessly shown) and the administrator has no prior knowledge on which profile to be imported. The administrator has to do a manual matching so as to determine which profile has to be imported. This manual matching is a difficult task as the number of servers increases. Further, assume that Server 1 has been re-used for a different application/workload and each time when the different application is going to be used, a different profile configuration has to be imported by the administrator. Again, in this scenario, identifying the appropriate profile for the application by manually matching can be very difficult.

Still further, consider the case of dynamic host configuration protocol (DHCP) provisioning which enables partial automation. DHCP is a network management protocol used on Internet Protocol (IP) networks whereby a DHCP server dynamically assigns an IP address and other network configuration parameters to each device on a network so they can communicate with other IP networks. DHCP provisioning works by a server requesting the profile from a profile repository. Once an "auto config" option is enabled, the server contacts the DHCP server where an entry points to the centralized profile repository location. The server then obtains the profile from the repository and imports the configuration. However, in a data center, each application/workload server requires a different profile configuration. In current DHCP provisioning, at a point in time, only one profile is configured for an application/workload server and there is no intelligence available to provide guidance on different profiles that need to be configured for that server.

Illustrative embodiments overcome the above and other challenges by providing improved profiling techniques. For example, whenever a device requires a profile, an analytics engine running one or more artificial intelligence/machine learning (AI/ML) algorithms determines an optimal profile based on the device needs. By way of further example, device information, application-specific requirements and current profile information is fed into the analytics engine and a recommendation for the best-fit profile for the device is output. In some embodiments, data center administrators have the authority to apply or reject the recommendation. Still further, a multi-label classification approach based on correlation between labels is used to enable the analytic engine to not only identify a best-fit profile (from existing ones) but also is configured to create a new customized profile by selecting chunks (sub-profiles or mini-profiles) from different profiles. For example, referring back to FIG. 3, there are five servers and five different policies shown. In accordance with illustrative embodiments, a sixth profile can be created on-the-fly (in real-time) if a given server needs different sections from one or more of the five different profiles, otherwise a best-fit from the existing ones can be recommended. As illustratively used herein, a profile may also be referred to as a policy file.

Figure 4:
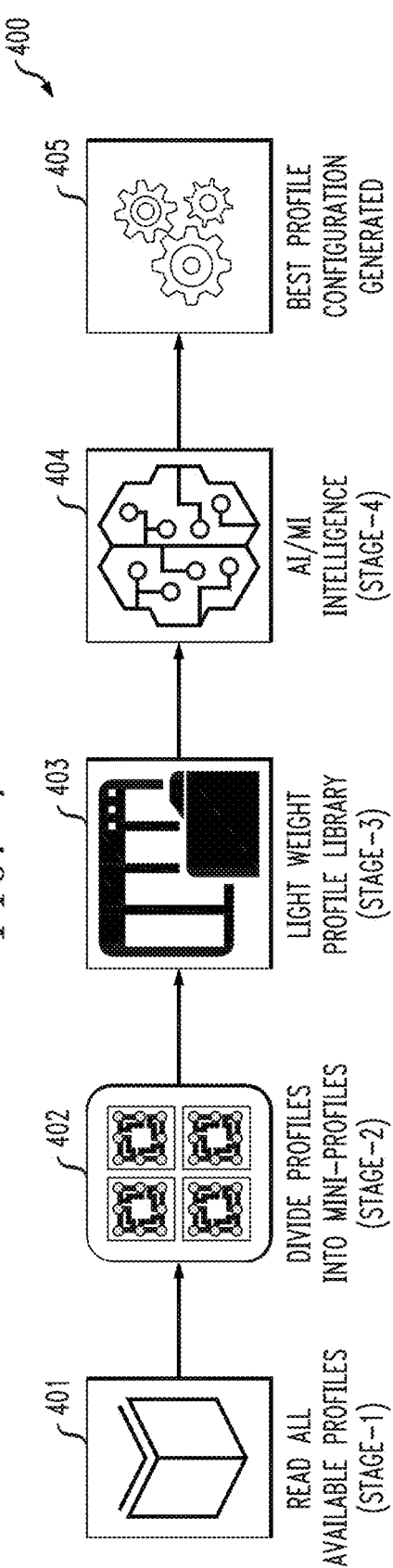
FIG. 4 depicts a multi-stage workflow for device configuration using profiling according to an illustrative embodiment.

FIG. 4 depicts a multi-stage workflow 400 for device configuration using profiling according to an illustrative embodiment. More particularly, workflow 400 illustrates four main stages of the profile management workflow. Further details of each stage will be further described in accordance with previous and subsequent figures. It is to be understood that while workflow 400 depicts four main stages and certain illustrative implementation details for certain devices, alternative embodiments are not limited to any specific number of stages, any specific implementation details or any specific devices but are more generally applicable to any information processing system that would benefit from improved profile management techniques described herein.

Step 401 (Stage 1): As shown in the workflow 400, all available profiles of in-use servers in the data center are read or otherwise obtained from a profile repository which is managed and maintained by a data center administrator. "In-use servers" as used here illustratively means servers that are currently operating (online) as part of the data center operations. Recall that FIG. 2 illustrates an example of a server profile with different configurable/reconfigurable component attributes (also understood in some embodiments to comprise preferences) associated with the server.

Step 402 (Stage 2): Each profile comprises different components of the server for which the profile applies. In accordance with illustrative embodiments using a multi-label classification algorithm based on correlation between labels as will be further explained below, each of one or more of the server profiles is divided into two or more mini-profiles. For example, for a given server, its corresponding mini-profiles can respectively represent components of the server, e.g., network mini-profile, CPU mini-profile, hard disk mini-profile, fan mini-profile, power supply mini-profile, BIOS mini-profile, etc. In additional illustrative embodiments, for a given profile, so long as a part of the profile associated with one component of the server is divided out, the remaining parts of the original profile can still be considered a mini-profile (also referred to as a sub-profile).

Step 403 (Stage 3): the mini-profiles are stored in a mini-profile (also referred to as a lightweight profile) library with appropriate tagging as will be further explained below.

Step 404 (Stage 4): given the need for configuration of a new server coming online in the data center or reconfiguration of an in-use server, a profile analysis module using one or more AI/MI algorithms analyzes criteria such as current hardware and software inventory, application-specific requirements, and device telemetry information. The analysis module accesses the mini-profile library and, using some or all of the above-mentioned criteria, identifies mini-profiles (created in stages above) for components of the new server. The analysis module then creates a profile for the new server from the identified mini-profiles. Thus, the result 405 of Stage 4 is the creation of a best-fit profile for configuration/reconfiguration of the server. Alternatively, if a full profile for an existing server or a single mini-profile (created in stages above) is determined by the analysis module as a best-fit or match for the new server, the existing profile or single mini-profile is recommended as the profile for the server. It is to be understood that use of the term "best-fit" herein is intended to comprise optimal, sub-optimal and substantially optimal match since when an ideal profile selection cannot be identified, a sub-optimal or substantially optimal profile will be selected as the best fit.

Figure 5:
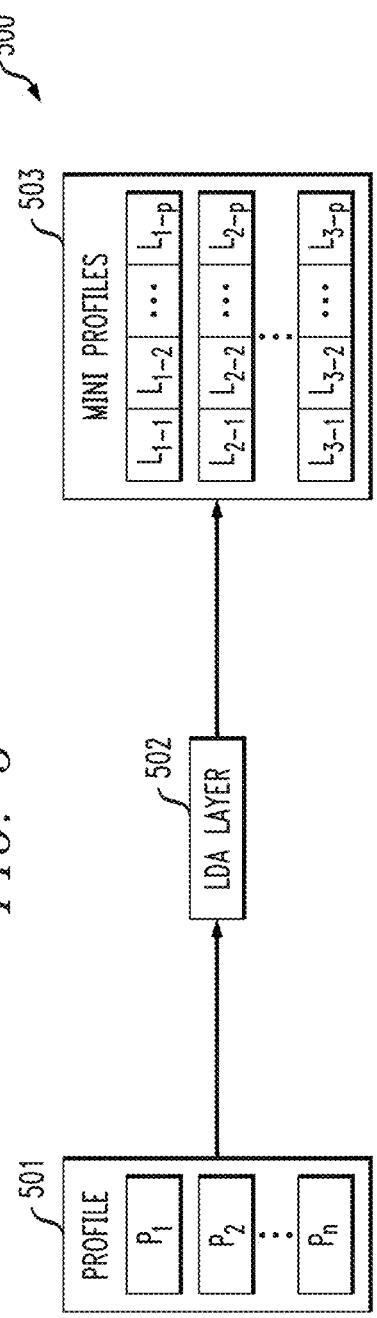
FIG. 5 depicts a profile division stage of a multi-stage methodology for device configuration using profiling according to an illustrative embodiment.

Stage 2 will now be further illustratively described. More particularly, FIG. 5 depicts a profile division stage of a multi-stage methodology 500 for device configuration using profiling according to an illustrative embodiment. As shown, a set of profiles 501 ($P_1, P_2, \ldots, P_n$) associated with devices (e.g., servers) is input to an LDA layer module 502. LDA stands for Latent Dirichlet Allocation (LDA) which is a well-known data processing technique that automatically discovers topics that a given data set contains. More specifically, LDA is a generative statistical model that allows sets of observations to be explained by unobserved groups that explain why some parts of the data are similar. For example, in terms of natural language processing, if observations are words collected into documents, an LDA model represents that each document is a mixture of a number of topics and that the presence of each word is attributable to one of the topics of the document. Thus, LDA tags a document with topic tags. LDA is also considered an AI/ML-based algorithm.

Accordingly, module 502 uses LDA to divide each profile $P_1, P_2, \ldots, P_n$ in set 501 into sets of multiple mini-profiles 503 ($L_{1-1}, L_{1-2}, \ldots, L_{1-p}; L_{2-1}, L_{2-2}, \ldots, L_{2-p}; \ldots; L_{n-1}, L_{n-2}, \ldots, L_{n-p}$) based upon the components and configurations in each profile. More particularly, for each profile, LDA layer module 502 treats each component and its associated configuration details as a tagged topic, and divides the given profile ($P_1$) into tagged topics such that each component and its associated configuration details is a mini-profile ($L_{1-1}, L_{1-2}, \ldots, L_{1-p}$) of the given profile. Further details of the profile division stage (step 402) are described below in accordance with FIGS. 6A and 6B.

Figure 6A:
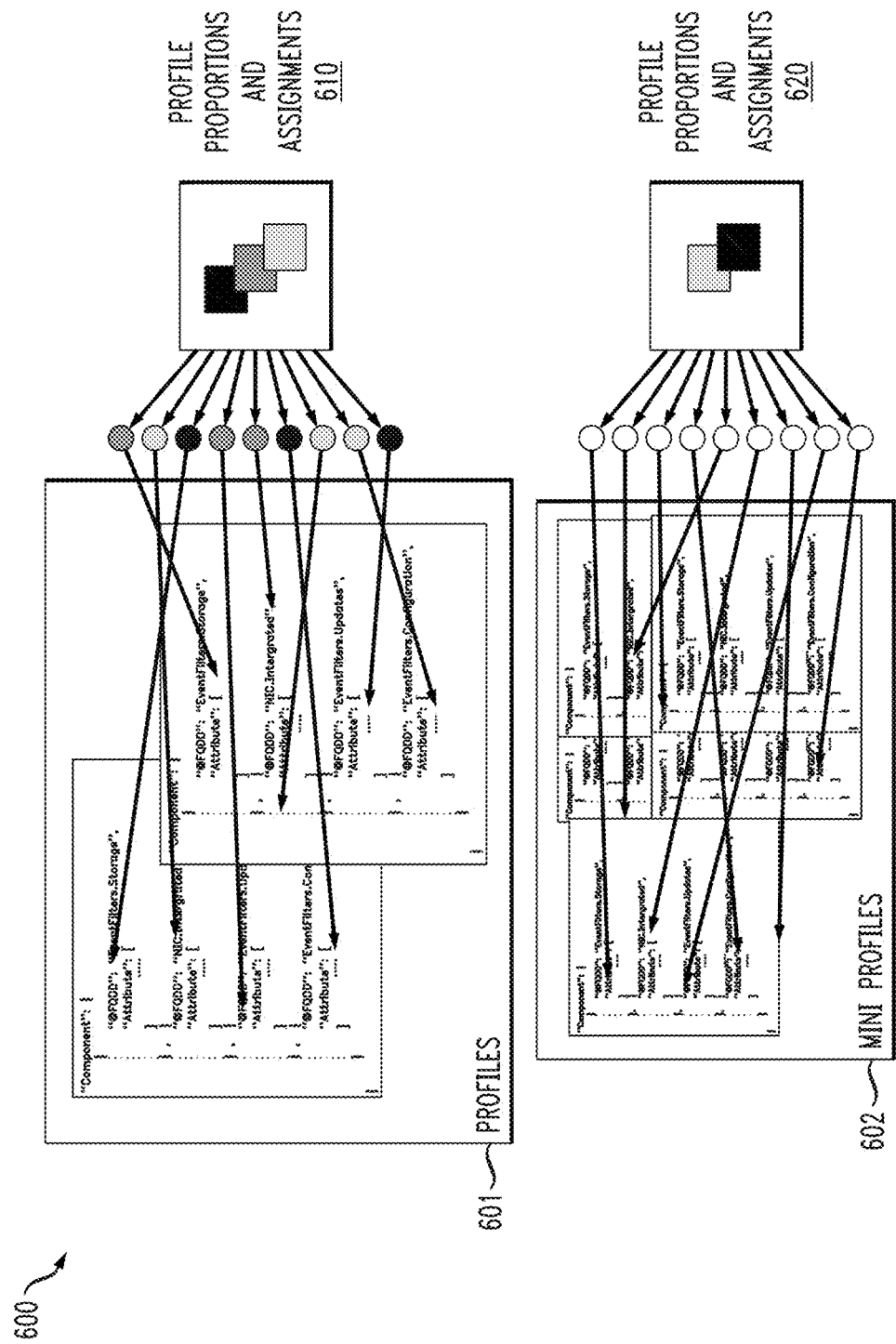
FIG. 6A depicts further details of a profile division stage of a multi-stage methodology for device configuration using profiling according to an illustrative embodiment.

FIG. 6A depicts further details 600 of a profile division stage of a multi-stage methodology for device configuration using profiling according to an illustrative embodiment. It is to be understood that, in accordance with illustrative embodiments, the further details described with reference to FIG. 6A are performed by LDA layer module 502 (FIG. 5).

As shown, each profile in a set of profiles 601 is respectively divided into two or more mini-profiles and stored as sets of mini-profiles 602.

In some embodiments, each profile of the set of profiles 601 is a random mixture of components and each attribute is drawn from one of these components. Recall that an attribute is a configurable value associated with a given component. A component may have one or more such attributes.

The profile division stage in one or more illustrative embodiments comprises a generative process. In some embodiments, the generative process starts off with a distribution made over components that are present in a given profile. The distribution, denoted as profile proportions and assignments 610, is drawn from a Dirichlet distribution (i.e., via LDA layer module 502) where various grey shades reflect probabilities representing attributes. These attributes are then drawn from each distribution (mini-profiles 602), followed by attributes (network, storage, etc.) being mapped to the respective grey shades.

The profile division stage in one or more illustrative embodiments further comprises a posterior distribution process. Such distribution occurs on the latent variables (components and attributes of a given profile) upon conditional observations, that can be applied using the attributes of the available profile. The main objective is to extract the component structure from the available profile, that includes the generation of the different components from each profile and generating a distribution over them. Iteratively, each profile is selected and associated to the distribution over each component, and components are fetched from the respective profile to be mapped with the attributes, denoted as profile proportions and assignments 620.

Figure 6B:
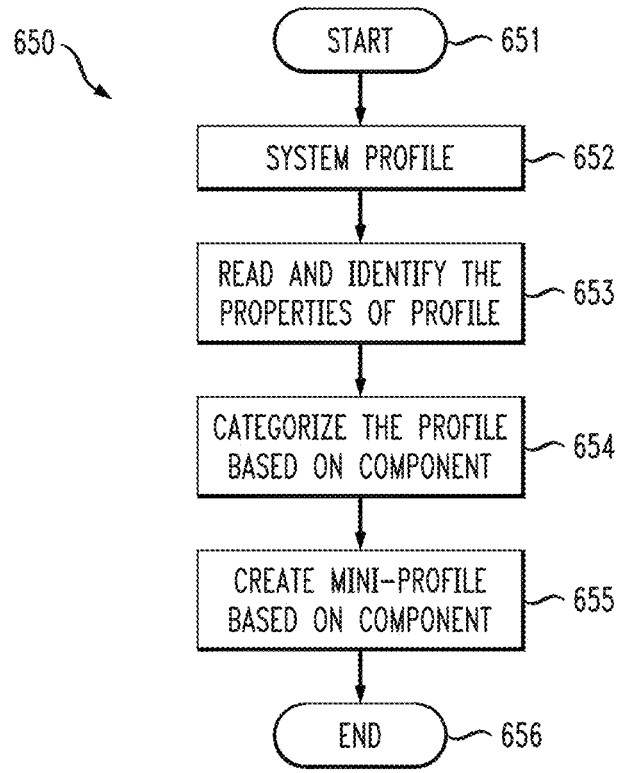
FIG. 6B depicts a workflow for the profile division stage of FIG. 6A according to an illustrative embodiment.

FIG. 6B depicts a workflow 650 for the profile division stage of FIG. 6A according to an illustrative embodiment. More particularly, as shown, workflow 650 starts at block 651 and loads a given profile (device or system profile) in step 652. In step 653, workflow 650 reads and identifies the properties (e.g., components and their corresponding attributes) of the profile. In step 654, workflow 650 categorizes the profile based on component(s) and creates a mini-profile(s) based on the component(s) in step 655. Workflow 650 ends at block 656.

Figure 7:
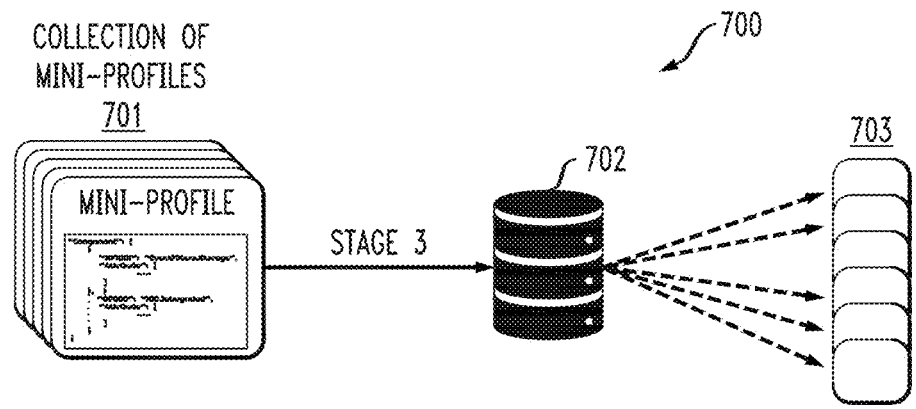
FIG. 7 depicts a mini-profile library creation stage of a multi-stage methodology for device configuration using profiling according to an illustrative embodiment.

Turning now to FIG. 7, a mini-profile library creation stage 700 of a multi-stage methodology for device configuration using profiling according to an illustrative embodiment is depicted. Recall from FIG. 4 that the mini-profile library creation stage is referred to as Stage 3. In Stage 3, the mini-profiles 701 which are generated as the part of the output of Stage 2 are stored in a storage system 702 to form an accessible mini-profile library 703. Thus, since each profile is a combination of 'n' different components, each profile is divided into multiple logical and re-useable contextual-based mini-profiles available in library 703. As will be further explained below in Stage 4, mini-profiles can be combined to address the configuration of new devices and/or reconfigured devices.

Figure 8A:
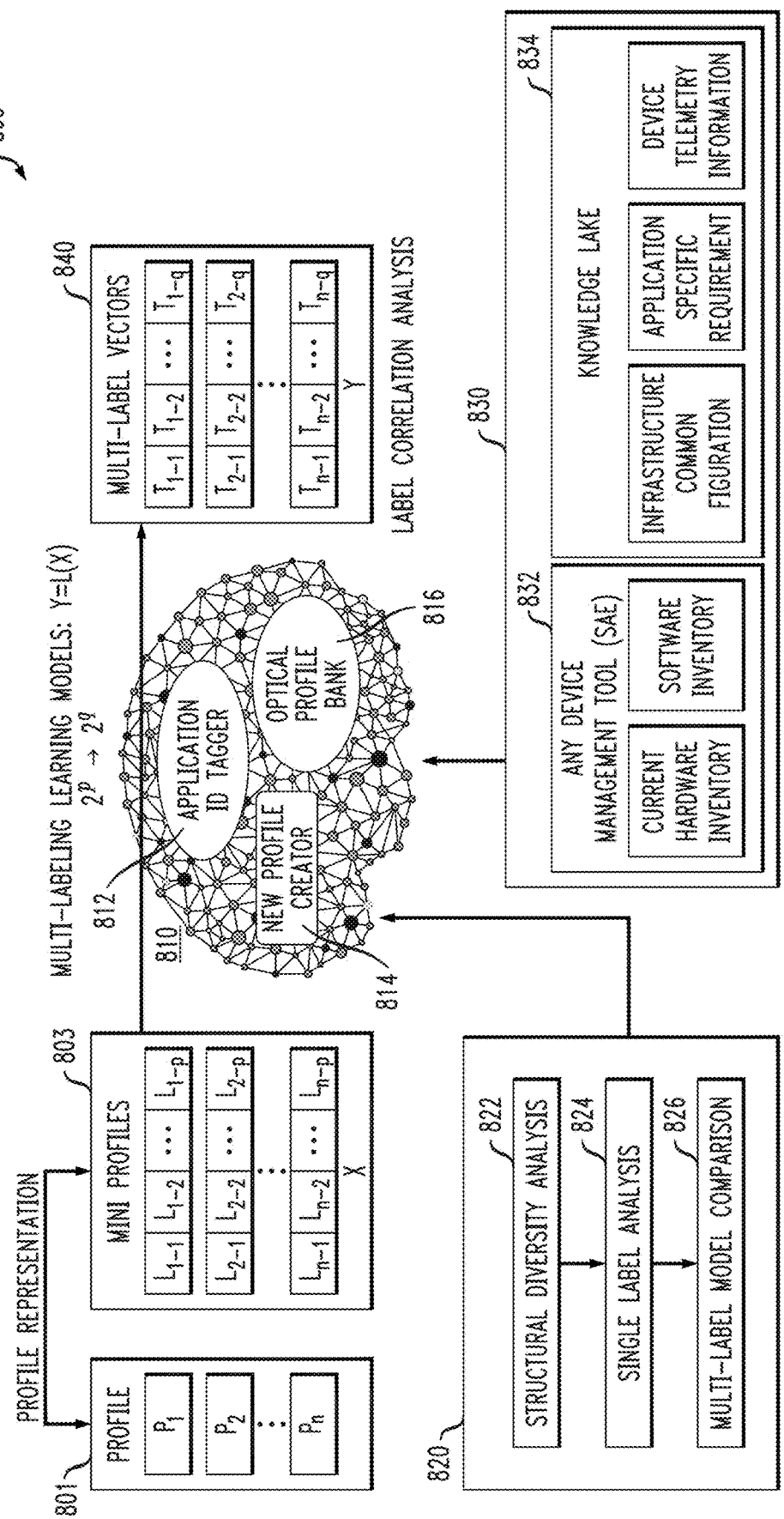
FIG. 8A depicts an artificial intelligence-based analysis stage of a multi-stage methodology for device configuration using profiling according to an illustrative embodiment.

FIG. 8A depicts an artificial intelligence-based analysis stage 800 of a multi-stage methodology for device configuration using profiling according to an illustrative embodiment. Recall from FIG. 4 that the artificial intelligence-based analysis stage is referred to as Stage 4. As shown, a set of profiles 801 are divided into a set of mini-profiles 803, for example, as described herein in accordance with Stage 2 (FIGS. 5 and 6). The set of mini-profiles 803 are accessible from a profile library (e.g., library 703 created in Stage 3). Also shown, an optimal profile analysis module (OPAM)

810, which functions as a centralized artificial intelligence system, comprises an application identifier (ID) tagger module 812, a new profile creator module 814 and an optimal profile bank 816. OPAM 810 starts by accessing the set of mini-profiles 803. In an alternative embodiment, the conversion of available profiles into a set of mini-profiles can be implemented as part of OPAM 810. To predict the best-fit profile match for a given device, OPAM 810 utilizes two sets of inputs 820 and 830. Input 820 comprises data from a structural diversity analysis 822, a single label analysis 824 and a multi-label model comparison 826. Input 830 comprises data from a device management tool (e.g., Support Assist Enterprise or SAE) 832 including current hardware and software inventory and data from a knowledge lake 834 including infrastructure common configuration, application specific requirements and device telemetry information. Using input 820 and 830, OPAM 810 generates a set of multi-label vectors 840 ($T_{1-1}$, $T_{1-2}$, ..., $T_{1-q}$; $T_{2-1}$, $T_{2-2}$, ..., $T_{2-q}$; ...; $T_{n-1}$, $T_{n-2}$, ..., $T_{n-q}$) using a multi-label learning model: $Y=L(X)$ where X represents the set of mini-profiles 803 and Y represents the set of multi-label vectors 840. The set of multi-label vectors 840 provides the recommendation for the best-fit profile (e.g., an existing profile from set 801 or a new profile which is a combination of two or more mini-profiles from set 803) for any enterprise device. It is to be appreciated that the various analyses in input 820 and the label correlation analysis that results in the multi-label vectors 840 can be performed in one or more illustrative embodiments by a conventional multi-label classification algorithm such as, but not limited to, A. Yanpi and M. Taheri, "A Large-Margin Approach for Multi-Label Classification Based on Correlation Between Labels," 5th Conference on Knowledge Based Engineering and Innovation (KBEI), pp. 713-716, 2019, the disclosure of which is incorporated herein by reference in its entirety.

More particularly, application ID tagger module 812 analyzes the set of mini-profiles 803 and tags each sub-profile with a relevant application ID. Further, one or more sub-profiles that are commonly used can be designated as generic profiles. Device management tool 832 provides the current hardware and software details which are used to identify the relevant application labeled in the mini-profiles in order to form an optimal configuration profile. Application specific requirements in knowledge lake 834 include a list of features to be enabled for applications. This module is extensible and new learning by the algorithm is added to this module. Infrastructure common configurations in knowledge lake 834 include the data center specific information such as data center name, device asset name, user credentials, etc.

Further, optimal profile bank module 816 stores the existing optimal (best-fit) profiles along with a system inventory. When a similar hardware configuration request for a profile is made, the profile is provided from the optimal profile bank module 816. Still further, new profile creator module 814 is responsible for creating a new profile based on the telemetry data collected from the respective device. Post analysis, a requirement map of the components is generated using the mini-profile library, and a customized profile is created for the respective device. This newly generated profile is, for example, a blend of mini-profiles. The newly created profile is stored in the optimal profile bank module 816 for future similar requests.

FIG. 8B depicts a workflow 850 for the artificial intelligence-based analysis stage of FIG. 8A according to an illustrative embodiment. More particularly, as shown, workflow 850 starts at block 851 and divides profiles into a set of mini-profiles in step 852 as described herein. From the mini-profiles, multi-label vectors are generated in step 853. Workflow 850 inputs current hardware and software inventory data in step 854, inputs knowledge lake data in step 855, and loads the input data into the analytics engine in step 856. New optimal profiles are created in step 857 as described herein, and stored for future reference in step 858. Workflow 850 ends at block 859.

Figure 9A:
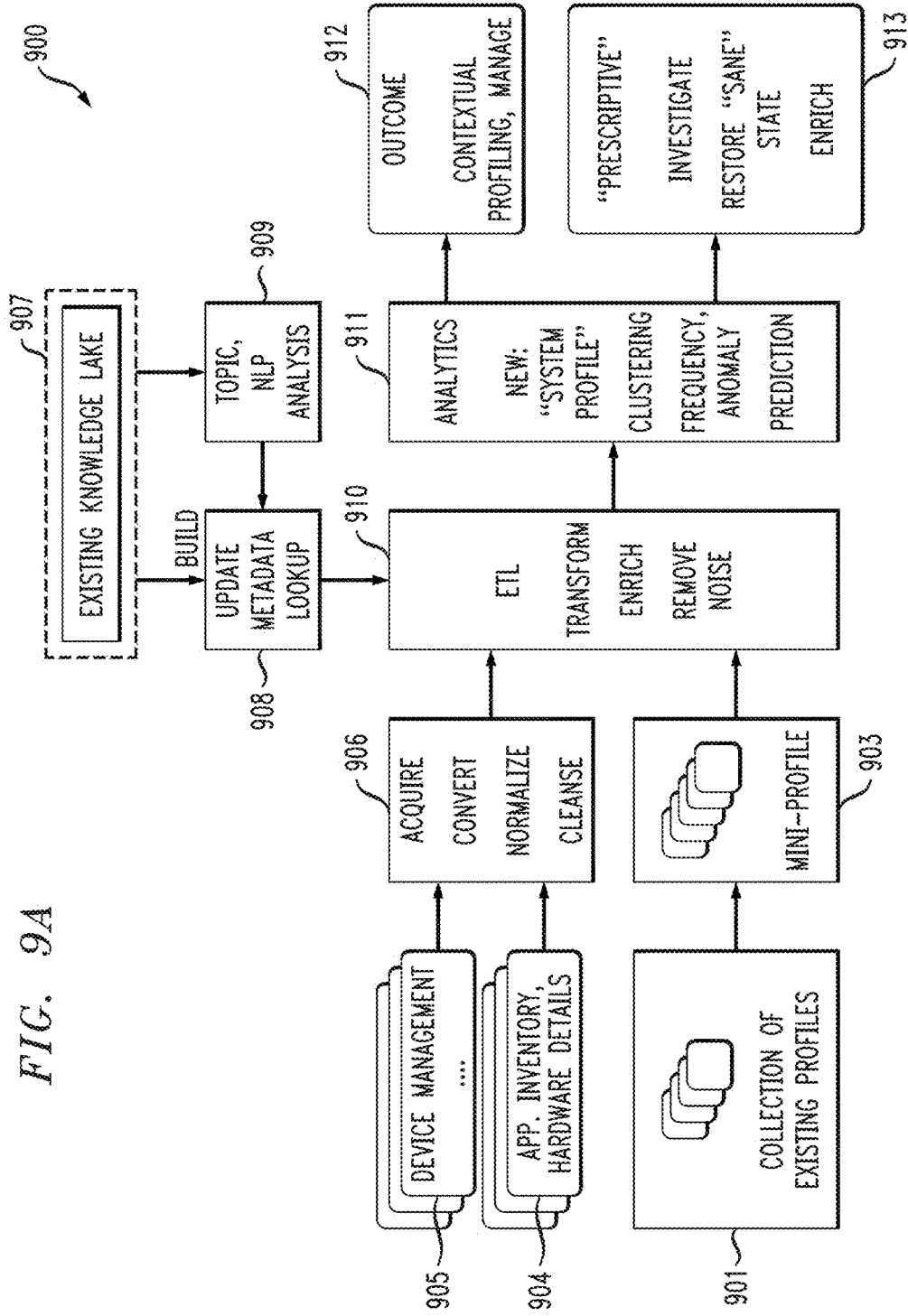
FIG. 9A depicts a system for implementing a multi-stage system for device configuration using profiling according to an illustrative embodiment.

FIG. 9A depicts a system 900 for implementing a multi-stage system for device configuration using profiling according to an illustrative embodiment. As shown, a set of profiles 901 are divided into a set of mini-profiles 903, for example, as described herein. Application inventory and hardware details 904 and device management information 905 for a given device are processed (acquired, converted, normalized and cleansed) in processing module 906. The resulting data from processing module 906 and the set of mini-profiles 903 are input to ETL module 910. ETL (extract, transform, load) is the general procedure of copying data from one or more sources into a destination system which represents the data differently from the source or in a different context than the source. Also as shown, data from an existing knowledge lake 907 is input to an update metadata lookup module 908 and an NLP analysis module 909 which respectively process the data from the existing knowledge lake 907. Topics are identified by module 909 and provided to module 908. Results from module 908 are then provided to ETL module 910. Results from ETL module 910 are input to an analytics module 911 which generates an outcome result 912 and a prescriptive result 913. The prescriptive result 913 can include restoration of a "sane" state, i.e., if the system automatically generates a configuration profile that a data center administrator feels is not correct, the administrator can override the system recommendation and apply a profile of the administrator's choosing or the administrator can enrich (or otherwise modify) the automatically generated profile as needed.

Figure 9B:
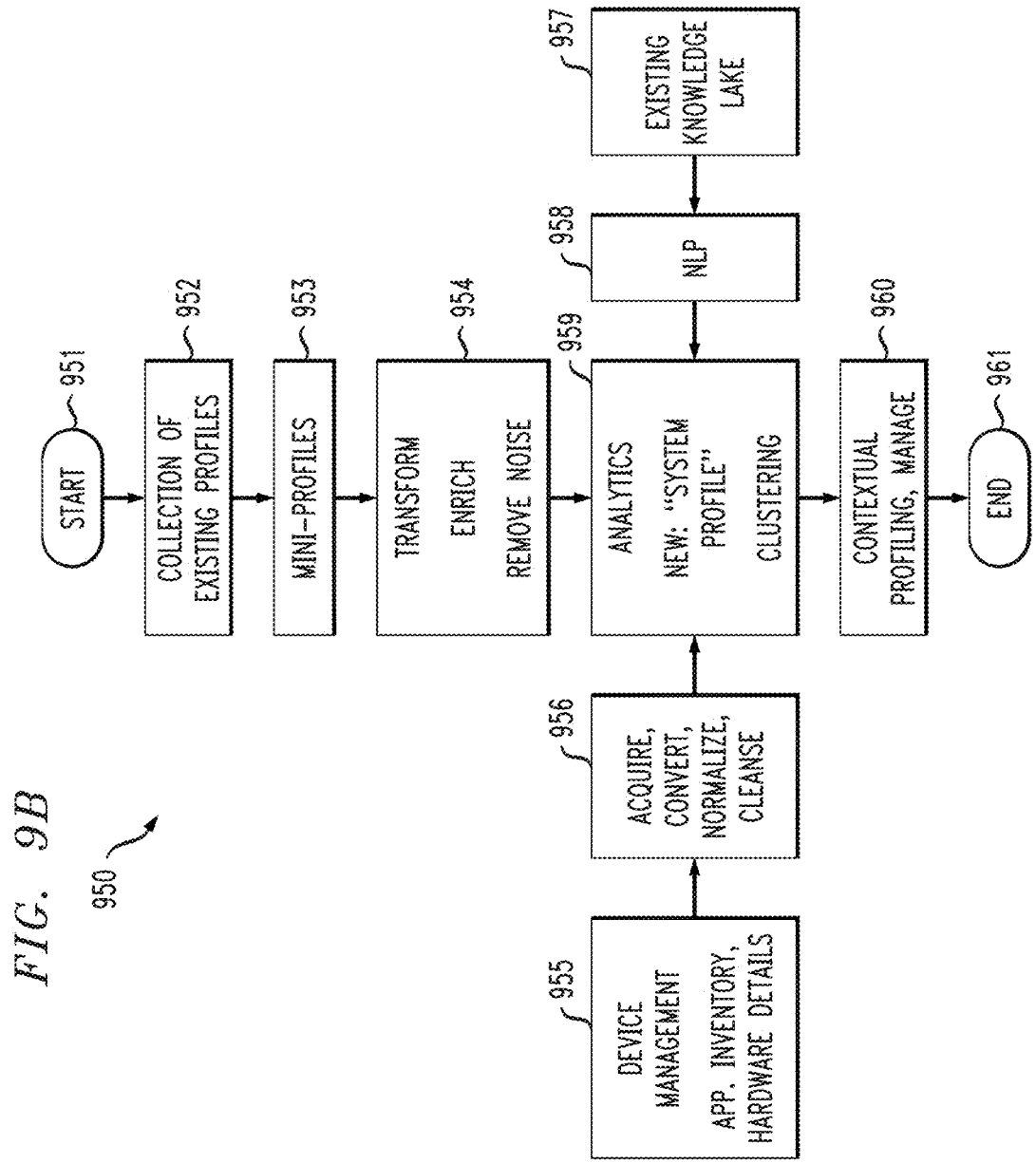
FIG. 9B depicts a workflow for the multi-stage system of FIG. 9A according to an illustrative embodiment.

FIG. 9B depicts a workflow 950 for the multi-stage system of FIG. 9A according to an illustrative embodiment. More particularly, as shown, workflow 950 starts at block 951 and divides profiles 952 into a set of mini-profiles 953. Typical data pre-processing (e.g., transformation, enrichment, noise removal) can be applied in step 954. Workflow 950 inputs device management, application inventory and hardware detail data in step 955 and pre-processes it in step 956, inputs knowledge lake data in step 957 and applied NLP in step 958, and loads the input data into the analytics engine in step 959. Contextual profiling management is performed (e.g., new optimal profiles are created and stored for future reference) in step 960. Workflow 950 ends at block 961.

Advantageously, as described herein in one or more illustrative embodiments, a method is provided that breaks full profiles into smaller logical sub-profiles (e.g., mini-profiles) which can also act as a reusable mini-profiles. The mini-profiles themselves can be further broken down into smaller logical sub-profiles. In other illustrative embodiments, a method is provided that selects a most appropriate profile (contextual match) for a given device using a process that correlates criteria such as current device state, one or more applications installed, and upcoming requirements for the device. In yet other illustrative embodiments, a method is provided that generates a new customized run-time profile for a given device by combining multiple mini-profiles using an optimal profile analysis module.

Figure 10:
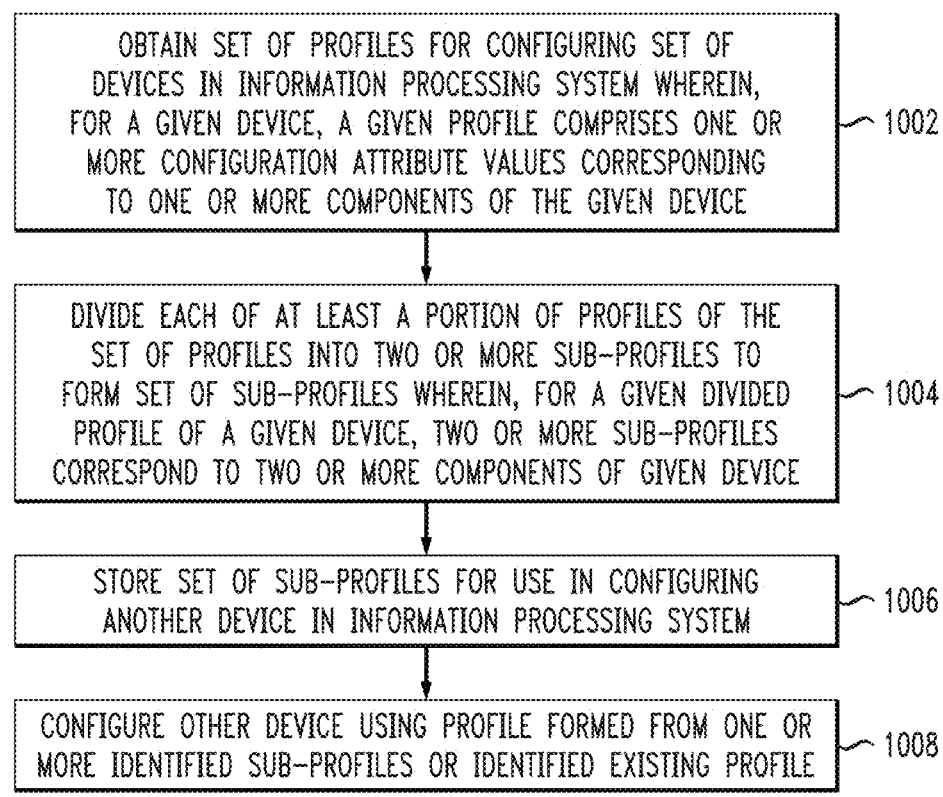
FIG. 10 depicts a multi-stage methodology for device configuration using profiling according to an illustrative embodiment.

FIG. 10 depicts a multi-stage methodology 1000 for device configuration using profiling according to an illustrative embodiment. Step 1002 obtains a set of profiles for configuring a set of devices in an information processing system wherein, for a given device, a given profile comprises one or more configuration attribute values corresponding to one or more components of the given device. Step 1004 divides each of at least a portion of the profiles of the set of profiles into two or more sub-profiles to form a set of sub-profiles wherein, for a given divided profile of a given device, two or more sub-profiles respectively correspond to two or more components of the given device. Step 1006 stores the set of sub-profiles for use in configuring another device in the information processing system. Step 1008 configures the other device using a profile formed from one or more identified sub-profiles or an identified existing profile.

Figure 11:
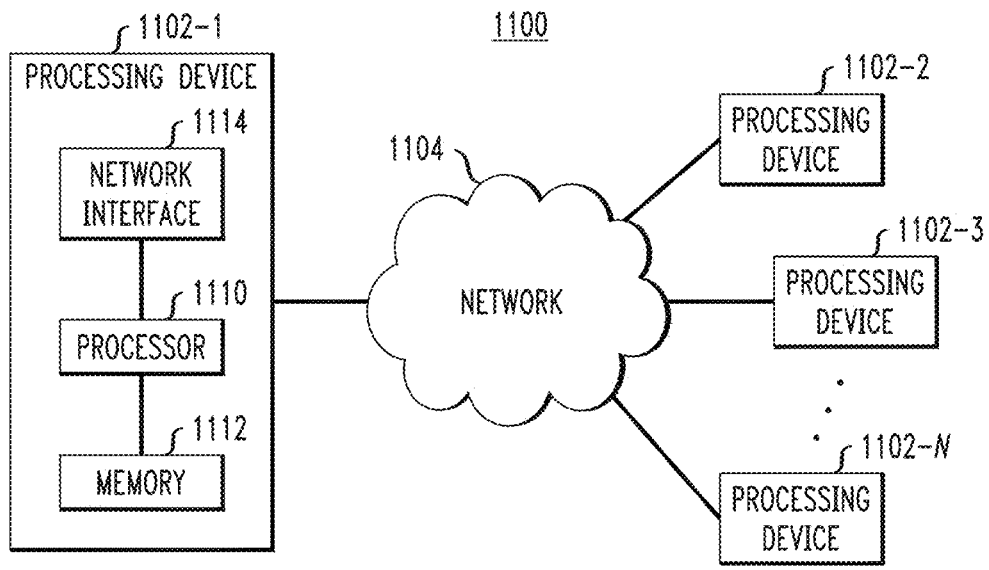
FIG. 11 depicts a processing platform for implementing a multi-stage methodology for device configuration using profiling according to an illustrative embodiment.

FIG. 11 depicts a processing platform 1100 used to implement improved profiling according to an illustrative embodiment. More particularly, processing platform 1100 is a processing platform on which a computing environment with functionalities described herein (e.g., FIGS. 1-10 and otherwise described herein) can be implemented.

The processing platform 1100 in this embodiment comprises a plurality of processing devices, denoted 1102-1, 1102-2, 1102-3, . . . 1102-N, which communicate with one another over network(s) 1104. It is to be appreciated that the methodologies described herein may be executed in one such processing device 1102, or executed in a distributed manner across two or more such processing devices 1102. It is to be further appreciated that a server, a client device, a computing device or any other processing platform element may be viewed as an example of what is more generally referred to herein as a "processing device." As illustrated in FIG. 11, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 1102 shown in FIG. 11. The network(s) 1104 represent one or more communications networks that enable components to communicate and to transfer data therebetween, as well as to perform other functionalities described herein.

The processing device 1102-1 in the processing platform 1100 comprises a processor 1110 coupled to a memory 1112. The processor 1110 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1110. Memory 1112 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1112 may comprise electronic memory such as random-access memory (RAM), read-only memory (ROM) or other types of memory, in any combination. The one or more software programs when executed by a processing device such as the processing device 1102-1 causes the device to perform functions associated with one or more of the components/steps of system/methodologies in FIGS. 1-10. One skilled in the art would be readily able to implement such software given the teachings provided herein. Other examples of processor-readable storage media embodying embodiments of the invention may include, for example, optical or magnetic disks.

Processing device 1102-1 also includes network interface circuitry 1114, which is used to interface the device with the networks 1104 and other system components. Such circuitry may comprise conventional transceivers of a type well known in the art.

The other processing devices 1102 (1102-2, 1102-3, . . . 1102-N) of the processing platform 1100 are assumed to be configured in a manner similar to that shown for computing device 1102-1 in the figure.

The processing platform 1100 shown in FIG. 11 may comprise additional known components such as batch processing systems, parallel processing systems, physical machines, virtual machines, virtual switches, storage volumes, etc. Again, the particular processing platform shown in this figure is presented by way of example only, and the system shown as 1100 in FIG. 11 may include additional or alternative processing platforms, as well as numerous distinct processing platforms in any combination.

Also, numerous other arrangements of servers, clients, computers, storage devices or other components are possible in processing platform 1100. Such components can communicate with other elements of the processing platform 1100 over any type of network, such as a wide area network (WAN), a local area network (LAN), a satellite network, a telephone or cable network, or various portions or combinations of these and other types of networks.

Furthermore, it is to be appreciated that the processing platform 1100 of FIG. 11 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1100 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-11 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus comprising:
a processing platform comprising at least one processor coupled to at least one memory;
the processing platform configured to:
obtain a set of profiles for configuring a set of devices in an information processing system wherein, for a given device, a given profile comprises one or more configuration attribute values corresponding to one or more components of the given device;
divide each of at least a portion of the profiles of the set of profiles into two or more sub-profiles to form a set of sub-profiles wherein, for a given divided profile of a given device, two or more sub-profiles respectively correspond to two or more components of the given device;
store the set of sub-profiles;
analyze at least a portion of the set of sub-profiles;
identify one or more sub-profiles from the set of sub-profiles that are a match for another device in the information processing system based on the analysis; and
form a profile for the other device from the one or more identified sub-profiles.

2. The apparatus of claim 1, wherein the processing platform is further configured to:
identify a profile from the set of profiles based on the analysis; and
form a profile for the other device from the identified profile.

3. The apparatus of claim 2, wherein the processing platform is further configured to:
configure the other device using the profile formed from the one or more identified sub-profiles or the identified profile.

4. The apparatus of claim 1, wherein identifying the one or more sub-profiles from the set of sub-profiles that are a match for the other device is based on a multi-label classification operation that correlates two or more of a current device state, one or more applications installed on the device, and one or more anticipated device requirements.

5. The apparatus of claim 4, wherein the multi-label classification operation comprises one or more artificial intelligence-based algorithms.

6. An apparatus comprising:
a processing platform comprising at least one processor coupled to at least one memory;
the processing platform configured to:
obtain a set of profiles for configuring a set of devices in an information processing system wherein, for a given device, a given profile comprises one or more configuration attribute values corresponding to one or more components of the given device;
divide each of at least a portion of the profiles of the set of profiles into two or more sub-profiles to form a set of sub-profiles wherein, for a given divided profile of a given device, two or more sub-profiles respectively correspond to two or more components of the given device; and
store the set of sub-profiles for use in configuring another device in the information processing system;
wherein dividing each of at least a portion of the profiles of the set of profiles into two or more sub-profiles to form the set of sub-profiles further comprises using a topic tagging operation wherein, for a given profile, each component and its one or more configuration attribute values is tagged as a topic, and the given profile is divided into tagged topics such that each component and its one or more configuration attribute values becomes part of a given sub-profile of the given profile.

7. A method performed by a processing platform, comprising:
obtaining a set of profiles for configuring a set of devices in an information processing system wherein, for a given device, a given profile comprises one or more configuration attribute values corresponding to one or more components of the given device;
dividing each of at least a portion of the profiles of the set of profiles into two or more sub-profiles to form a set of sub-profiles wherein, for a given divided profile of a given device, two or more sub-profiles respectively correspond to two or more components of the given device;
storing the set of sub-profiles;
analyzing at least a portion of the set of sub-profiles;
identifying one or more sub-profiles from the set of sub-profiles that are a match for another device in the information processing system based on the analysis; and
forming a profile for the other device from the one or more identified sub-profiles;
wherein the processing platform comprises at least one processor coupled to at least one memory.

8. The apparatus of claim 1, wherein identifying the one or more sub-profiles from the set of sub-profiles that are a match for the other device is based on a contextual matching operation.

9. The method of claim 7, further comprising:
identifying a profile from the set of profiles based on the analysis; and
forming a profile for the other device from the identified profile.

10. The method of claim 9, further comprising:
configuring the other device using the profile formed from the one or more identified sub-profiles or the identified profile.

11. The method of claim 7, wherein identifying the one or more sub-profiles from the set of sub-profiles that are a match for the other device is based on a multi-label classification operation that correlates two or more of a current device state, one or more applications installed on the device, and one or more anticipated device requirements.

12. The method of claim 11, wherein the multi-label classification operation comprises one or more artificial intelligence-based algorithms.

13. The method of claim 7, wherein dividing each of at least a portion of the profiles of the set of profiles into two or more sub-profiles to form the set of sub-profiles further comprises using a topic tagging operation wherein, for a given profile, each component and its one or more configuration attribute values is tagged as a topic, and the given profile is divided into tagged topics such that each component and its one or more configuration attribute values becomes part of a given sub-profile of the given profile.

14. The method of claim 7, wherein identifying the one or more sub-profiles from the set of sub-profiles that are a match for the other device is based on a contextual matching operation.

15. A computer program product comprising a non-transitory processor-readable storage medium having stored therein program code of one or more software programs, wherein the program code, when executed by a processing platform comprising at least one processor coupled to at least one memory, causes the processing platform to:
obtain a set of profiles for configuring a set of devices in an information processing system wherein, for a given device, a given profile comprises one or more configuration attribute values corresponding to one or more components of the given device;
divide each of at least a portion of the profiles of the set of profiles into two or more sub-profiles to form a set of sub-profiles wherein, for a given divided profile of a given device, two or more sub-profiles respectively correspond to two or more components of the given device;
store the set of sub-profiles;
analyze at least a portion of the set of sub-profiles;
identify one or more sub-profiles from the set of sub-profiles that are a match for another device in the information processing system based on the analysis; and
form a profile for the other device from the one or more identified sub-profiles.

16. The computer program product of claim 15, wherein the processing platform is further caused to:
identify a profile from the set of profiles based on the analysis; and
form a profile for the other device from the identified profile.

17. The computer program product of claim 16, wherein the processing platform is further caused to:
configure the other device using the profile formed from the one or more identified sub-profiles or the identified profile.

18. The computer program product of claim 15, wherein identifying the one or more sub-profiles from the set of sub-profiles that are a match for the other device is based on a multi-label classification operation that correlates two or more of a current device state, one or more applications installed on the device, and one or more anticipated device requirements.

19. The computer program product of claim 15, wherein dividing each of at least a portion of the profiles of the set of profiles into two or more sub-profiles to form the set of sub-profiles further comprises using a topic tagging operation wherein, for a given profile, each component and its one or more configuration attribute values is tagged as a topic, and the given profile is divided into tagged topics such that each component and its one or more configuration attribute values becomes part of a given sub-profile of the given profile.

20. The computer program product of claim 15, wherein identifying the one or more sub-profiles from the set of sub-profiles that are a match for the other device is based on a contextual matching operation.

* * * * *